United States Patent [19]

Smith et al.

[11] 4,128,596

[45] Dec. 5, 1978

[54] ALKYLATION OF OLEFINS WITH PARAFFINS UTILIZING ALUMINUM HALIDE AND GROUP VA METAL HALIDE INTERCALATED IN GRAPHITE

[75] Inventors: Clifford E. Smith; Hans D. Holtz, both of Bartlesville, Okla.

[73] Assignee: Phillips Petroleum Company, Bartlesville, Okla.

[21] Appl. No.: 879,571

[22] Filed: Feb. 21, 1978

Related U.S. Application Data

[62] Division of Ser. No. 748,085, Dec. 6, 1976.

[51] Int. Cl.$^2$ .............................................. C07C 3/56
[52] U.S. Cl. ........................... 260/683.53; 260/683.47
[58] Field of Search ...................... 260/683.53, 683.47

[56] References Cited

U.S. PATENT DOCUMENTS

| 3,976,714 | 8/1976 | Rodewald | 260/683.53 |
| 3,984,352 | 10/1976 | Rodewald | 260/683.53 |

*Primary Examiner*—George Crasanakis

[57] ABSTRACT

A catalytically active composition is provided that is an intercalate of graphite, aluminum halide, and a Group VA metal halide. A process for preparing an intercalate of graphite, aluminum halide, and a Group VA metal halide is also provided.

7 Claims, No Drawings

ALKYLATION OF OLEFINS WITH PARAFFINS UTILIZING ALUMINUM HALIDE AND GROUP VA METAL HALIDE INTERCALATED IN GRAPHITE

This application is a division of copending application Ser. No. 748,085, filed Dec. 6, 1976.

BACKGROUND OF THE INVENTION

This invention relates to intercalates of graphite and aluminum chloride. In one of its aspects this invention relates to the preparation of intercalates of graphite and aluminum halide. In yet another of its aspects this invention relates to the preparation of aluminum halide-graphite intercalates also containing a Group VA metal halide. In another of its aspects this invention relates to the preparations of graphite and intercalates of aluminum halide using graphite intercalates of Group VA metal halides. In another of its aspects this invention relates to the catalysis of alkylation reactions using an intercalate of graphite, aluminum halide, and a Group VA metal halide.

This invention contemplates the ready preparation of a mixture of aluminum halide and a Group VA metal halide intercalated in graphite. It is well known that intercalates of aluminum halide and graphite are difficult to prepare, with the preparation by a known method comprising heating the aluminum halide salt with graphite in a sealed tube for several hours at an elevated temperature.

It is also known that intercalates of such Group VA metal halides as antimony pentachloride and graphite can be readily formed using a similar method of heating the salt with graphite at an elevated temperature. The present invention combines the ready preparation of a Group VA metal halide intercalate with graphite with an at least partial replacement of the Group VA metal chloride by aluminum chloride. Since the replacement of the Group VA metal chloride is most usually incomplete, an intercalate of graphite, aluminum chloride, and the Group VA metal halide results.

It is therefore an object of this invention to provide a method for preparing a composition catalytically active for alkylation. It is another object of this invention to provide a catalyst suitable for the alkylation of feedstocks comprising olefins and paraffins or isoparaffins. It is still another object of this invention to provide a method for preparing intercalates of graphite, aluminum halide, and a Group VA metal halide. It is still another object of this invention to provide a method for preparing intercalates of graphite and aluminum halide.

Other aspects, objects, and the various advantages of this invention will become apparent upon reading the specification and the attached claims.

STATEMENT OF THE INVENTION

According to this invention a method is provided for preparing a catalytic composition comprising contacting graphite with a Group VA metal halide to form a first intercalate, thereafter treating the first intercalate at a temperature sufficiently elevated and at a pressure sufficient to remove at least a part of the Group VA metal halide from the first intercalate composition, and thereafter contacting the composition from which Group VA metal halide has been removed with aluminum halide at a temperature and pressure sufficient to form a second intercalated structure incorporating therein aluminum halide.

In one embodiment of the invention the Group VA metal halide would be sufficiently removed and replaced by aluminum halide so that Group VA metal halide would be undetectable in the intercalate composition; however, in a practical and now preferred embodiment of the invention, removal of the Group VA metal halide and replacement with aluminum halide results in an intercalate structure of graphite, Group VA metal halide, and aluminum halide.

In another embodiment of the invention intercalate compositions produced by the method above-described are used as catalysts in the alkylation of olefins and paraffins or isoparaffins.

Alkylation feeds suitable for use in the alkylation reaction using catalysts of this invention include olefins containing from 2 to about 8 carbon atoms per molecule, more preferably from 2 to 4 carbon atoms per molecule and paraffins or isoparaffins containing from 3 to about 7 carbon atoms per molecule. Preferably, an isoparaffin containing from 4 to 6 carbon atoms per molecule is employed. Examples of suitable olefins include ethylene, propylene, butene-1, isobutylene, hexene-1, octene-1, etc. and mixtures thereof. Examples of suitable paraffins include propane, n-butane, isobutane, n-pentane, isopentane, n-hexane, isohexane, n-heptane, isoheptane, and mixtures thereof. In a preferred reaction, isobutane is alkylated, over the catalyst compositions of this invention, with ethylene to produce a product having a high research octane number (RON), i.e., about 100, which can be used as motor fuel.

The catalyst compositions of this invention are formed in several steps. Initially, an intercalate of graphite and a Group VA metal halide is formed under conditions of time, temperature and pressure which promote its formation. A temperature between about 80° C and about 150° C for between about 1–72 hours and a pressure from about 1–150 atmospheres can be employed. Chlorine can be present in this operation. Examples of the metal halides include antimony pentachloride, antimony pentafluoride, bismuth pentachloride, bismuth pentafluoride, arsenic pentachloride and arsenic pentafluoride. The corresponding bromides and iodides can also be employed. An antimony halide, preferably antimony pentachloride, is presently preferred.

The Group VA graphite-metal halide intercalate is subsequently treated under conditions of time, temperature, pressure and a purging gas or under a vacuum which promote the removal of a portion of the Group VA metal halide compound. A temperature ranging from about 170° to about 450° C in the presence of a purging gas such as nitrogen, argon or the like or in a vacuum and a pressure ranging from about 0.05 to about 1 atmosphere can be employed. The time to accomplish this is dependent upon the Group VA metal halide and the temperatures employed. Less time is required at higher temperatures than lower temperatures. When the metal halide is antimony pentachloride and a progressive temperature increase is employed such as from about 200° to about 320° C, the time needed to obtain the desired results generally ranges from about 2 to about 10 hours. After the heat treatment, the product is cooled to room temperature under an inert atmosphere.

The aluminum halide, which can be the fluoride, bromide, chloride or iodide, preferably the chloride because of ready availability, is the second metal halide intercalated in the graphite lattice. The removal of a portion of the Group VA metal halide is thought to facilitate the ready insertion of aluminum halide in the already expanded graphite lattice. The insertion is accomplished at temperatures ranging from about 80° to about 120° C by heating the components together for from about 5 to about 72 hours.

The molar ratio of Group VA metal halide to aluminum halide in the compounds can range from about 1.4:1 to about 0.15:1.

The molar ratio of graphite to Group VA metal halide plus aluminum halide in the final catalysts can range from about 2.3:1 to about 108:1.

The alkylation of isobutane with ethylene over the catalysts of this invention is carried out in a conventional manner at a temperature in the range from about 70° to about 150° F (21° – 66° C) and at about atmospheric pressure. The mole ratio of isobutane to ethylene can vary from about 3:1 to about 12:1, more preferably from about 5:1 to about 10:1.

EXAMPLE I

An antimony pentachloride-graphite compound was prepared by reacting in a sealed bottle, 19.59 grams, 20–65 mesh (U.S. Sieve Series), graphite obtained from Alpha Products, Beverly, Mass. and 19.22 grams of antimony pentachloride at 100° C for 48 hours. The cooled product was examined by X-ray and found to exhibit an intercalate structure. A portion of the compound, designated control catalyst 1, was subsequently tested as an alkylation catalyst. The sample was calculated to contain 50.5 weight percent graphite and 49.5 weight percent antimony pentachloride.

Control catalyst 2 was prepared by treating a portion of control catalyst 1 with HF vapor at atmospheric pressure for 2 hours at room temperature (23° C) and then flushed with dry nitrogen for 4 hours at 23° C.

Control catalyst 3 was prepared by heating in a sealed bottle, 39.13 grams of the graphite used in preparing control catalyst 1 with 9.07 grams of anhydrous aluminum chloride for 24 hours at 100° C. The sample was calculated to contain 81.2 weight percent graphite and 18.8 weight percent aluminum chloride.

Control catalyst 4 prepared by physically mixing 20.15 grams of the graphite with 5.39 grams anhydrous aluminum chloride. The sample was calculated to contain 78.9 weight percent graphite and 21.1 weight percent aluminum chloride.

Control catalyst 5 was a commercially obtained aluminum chloride-graphite intercalate described as containing 35–40 weight percent $AlCl_3$, the remainder being graphite.

Control catalyst 6 was prepared by heating 60.3 grams of the graphite with 24.3 grams anhydrous aluminum chloride and 3.2 grams antimony pentachloride in a sealed bottle at 100° C for 144 hours. Examination of the catalyst by X-ray disclosed that an intercalate was not formed. This catalyst was not tested in alkylation.

Invention catalyst 7 was prepared by gradually heating an 8.47 grams portion of the antimony pentachloride-graphite intercalate control catalyst 1 contained in a reactor under a dry nitrogen purge for 3.8 hours. The product was cooled to room temperature in the nitrogen stream. The initial temperature was about 23° C and the final temperature reached was 300° C. Some fuming was observed as the temperature reached 200° C. The sample lost 3.09 grams, amounting to 36.5 weight percent during the heat treatment. The original intercalate was calculated to contain 4.19 grams of antimony pentachloride (8.47 grams × 49.5 weight percent $SbCl_5$ =4.19 grams). The amount of $SbCl_5$ driven off was calculated to be 3.09/4.19 × 100 or 73.7 weight percent, thus leaving 1.10 grams $SbCl_5$ or 21.8 weight percent of the original salt still present in the structure. A 5.18 grams portion of the heat treated catalyst was then reacted at 100° C in a sealed bottle with 2.87 grams of anhydrous aluminum chloride for 72 hours. After 48 hours, visual examination of reactants disclosed that the aluminum chloride had disappeared. A sample of this material was examined by X-ray and found to exhibit the intercalate structure. The final catalyst was calculated to contain 51.2 weight percent graphite, 35.6 weight percent aluminum chloride and 13.2 weight percent antimony pentachloride. The calculated weight ratio of $SbCl_5:AlCl_3$ was 0.37:1 corresponding to a molar ratio of 0.2:1. The calculated molar ratio of graphite to $AlCl_3 + SbCl_5$ in the final compound was 14:1.

The catalysts, except for control catalyst 6, were individually evaluated as alkylation catalysts in a tubular fixed bed reactor at room temperature (23° C). Each catalyst was charged to the reactor and a gaseous feed containing 90 mole percent isobutane and 10 mole percent ethylene was passed through the catalyst bed. The effluent was analyzed by means of gas-liquid chromatography. The gaseous space velocities of the feed (volumes feed per volume catalyst per hour, GHSV) used in each run, the ethylene conversion obtained and selectivity to $C_6$ are presented in the following table.

TABLE

Alkylation With Graphite-Metal Chloride Catalysts

| Run No. | Cat. No. | Catalyst Wt. % $AlCl_3$ | Catalyst Wt. % $SbCl_5$ | g | Reaction Time, Hrs. | Feed GHSV | Ethylene Conversion, % | Selectivity[2] |
|---|---|---|---|---|---|---|---|---|
| 1 | 1 | na[1] | 49.5 | 3.02 | 1 | 5354 | 1.7 | nd[3] |
| 2 | 2 | na | 49.5 | 2.88 | 0.2 | 6287 | 0 | 0 |
| 3 | 3 | 18.8 | na | 6.21 | 1.8 | 52 | 26 | 96 |
| 4 | 4 | 21.1 | na | 7.45 | 1.5 | 58 | 50 | 90 |
| 5 | 5 | 35.40 | na | 3.69 | 1.8 | 194 | 100 | 66 |
| 6 | 7 | 35.6 | 13.2 | 2.32 | 2 | 3785 | 100 | 92 |

Notes:
[1]Not applicable
[2]Selectivity to $C_6$
[3]Not determined

Runs 1 and 2 show that a $SbCl_5$-graphite intercalate possesses only small catalytic activity for the alkylation of ethylene and isobutane at room temperature. Run 3 shows that an aluminum chloride-graphite compound made according to the procedures generally used in the invention is only moderately active as a catalyst under the conditions used. Run 4, made with a deliberate admixture of graphite and aluminum chloride exhibits moderate activity and the results obtained suggest that the run 3 catalyst is also a physical mixture. Aluminum chloride is well known as an alkylation catalyst but it does not have the capacity by itself to effect 100% conversion of ethylene and isobutane at room temperature to a $C_6$ product as runs 3 and 4 show. Run 5 demonstrates, however, that a graphite-aluminum chloride intercalate is active at room temperatures as an alkylation catalyst for the reaction of ethylene and isobutane. Invention run 6 shows that an intercalate composed of graphite-$SbCl_5$—$AlCl_3$ prepared according to the invention is much more active as an alkylation catalyst at room temperature than the other $AlCl_3$-graphite catalysts (100% conversion at almost 20 times the space velocity) in addition to showing a higher selectivity (26 points higher). Invention catalyst 7 is used in run 6.

The intercalate compounds of this invention are readily formed under mild conditions and they possess utility for alkylation under mild reaction conditions.

We claim:

1. A method for alkylation of olefins with paraffins comprising contacting said olefins and paraffins under alkylation conditions in the presence of a catalytic composition consisting essentially of intercalated structure of graphite containing aluminum halide and Group VA metal halide in the graphite lattice, the molar ratio of said Group VA metal halide to said aluminum halide being about 1.4:1 to about 0.15:1.

2. A method of claim 1 wherein said olefins contain from 2 to about 8 carbon atoms per molecule and said paraffins are chosen from paraffins and isoparaffins containing from 3 to about 7 carbon atoms per molecule.

3. A method of claim 2 wherein said olefin is ethylene and said paraffin is isobutane.

4. A method of claim 1 wherein said alkylation is carried out at a temperature in the range of about 70° to about 150° F.

5. A method of claim 1 wherein the molar ratio of paraffin to olefin varies from about 3:1 to about 12:1.

6. A method of claim 1 wherein in said catalytic composition the molar ratio of graphite to Group VA metal halide and aluminum halide ranges from about 2.3:1 to about 108:1.

7. A method of claim 6 wherein said Group VA metal is antimony and all metal halides in said catalyst composition are chlorides.

* * * * *